Figure 1:
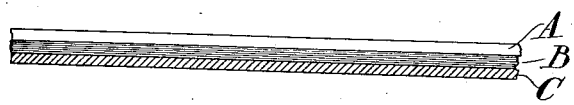

No. 804,039. PATENTED NOV. 7, 1905.
G. N. PIFER.
PHOTOGRAPHIC PLATE OR FILM.
APPLICATION FILED JULY 31, 1905.

Witnesses.
Walter F. Pullinger
Augustus B. Coppes

Inventor:
George N. Pifer
by his Attorneys

UNITED STATES PATENT OFFICE.

GEORGE N. PIFER, OF CLEVELAND, OHIO.

PHOTOGRAPHIC PLATE OR FILM.

No. 804,039.     Specification of Letters Patent.     Patented Nov. 7, 1905.

Application filed July 31, 1905. Serial No. 271,978.

*To all whom it may concern:*

Be it known that I, GEORGE N. PIFER, a citizen of the United States, residing in Cleveland, Ohio, have invented certain Improvements in Photographic Plates or Films, of which the following is a specification.

My invention is designed to take the place of the present method of making photographs by first producing by exposure in the camera a negative upon one photographic sensitive surface and then producing a positive image on another photographic sensitive surface by contact printing from said negative, the object of my invention being to produce a picture which is positive both as to position and light and shade upon one and the same film or other sensitive medium and by practically one operation—that is to say, by the exposure of said single film in the camera and subsequent treatment of said single film. While, however, the non-reversed positive photographic image can thus be made, exact duplicates can be made directly therefrom, so that no loss of advantage is incurred by reason of the first picture being a positive.

In carrying out my invention I take any suitable transparent body—such as celluloid, sheet-gelatin, transparent paper, or the like—and apply to the same a coating of a material which is or can subsequently be made relatively opaque when viewed by reflected light, yet which is transparent or relatively transparent to transmitted light and which is of a color desired for the lights of the finished picture. If desired, what is commonly termed "flashed" glass or translucent celluloid can be used, or for the usual black and white effects I may use a compound of gelatin or collodion with barium sulfate, tin oxid, or other practically inert substance, the compound being such as will present a proper surface for the high lights of the picture when viewed by reflected light and yet will remain transparent or partially transparent to transmitted light. In all cases, however, it will be noted that the photographic body consists of a suitable support having a sensitized coating and when prepared according to my invention therefore comprises different strata, one of which is light-transmitting and another of less transparency than the first, both forming a support which is relatively transparent to transmitted light, but relatively opaque to reflected light, and hence capable of forming for a positive picture a background relatively transparent to such transmitted light, but which is when viewed by the reflected light of a color suitable for high lights of said positive picture. In this specification and claims therefore where the term "strata" or "stratum" is used I wish it distinctly understood that I intend thereby to cover a structure in which the strata are formed either as a part of or integral with the structure of the support or as an independent layer or coating applied thereto or embedded or embodied therein, and, furthermore, where the material is defined in the claims as different from the support and in combination therewith it is to be understood that I intend thereby to cover such material whether applied to a surface of the support as a coating or separate layer or embedded or embodied therein or applied in any other suitable manner. The coating and its transparent support thus produced is then sensitized in any available way, and the sensitive film if exposed in the camera so that the light-rays from the object will pass first through the transparent support and its relatively transparent coating is capable of producing a true positive photograph, which when viewed by reflected light will have an opaque background. The image as produced in the camera is a positive as regards the position of the object photographed, and the lights and shades can be changed into a positive quality, when viewed by reflected light, by any of the methods usually practiced to attain that result. For instance, developed portions of the image may be removed with acids which will not affect the unaltered portions, and the latter can then be exposed to actinic light and redeveloped after such second exposure. I prefer, however, to omit the second exposure and subsequent development and effect the transformation of the bromid of silver or other silver salt in the film to sulfid of silver by direct treatment, as set forth, for instance, in my application, Serial No. 255,214, filed April 12, 1905.

Figure 2:
Figure 3:
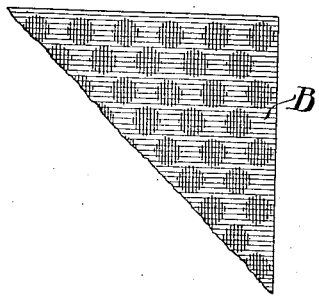

In the accompanying drawings, Figures 1 and 2 show sensitive plates or films constructed in accordance with my invention, and Fig. 3 is a much exaggerated view of a portion of one of said plates or films.

A represents the supporting-plate of transparent material, B the coating which is relatively transparent to transmitted light and relatively opaque when viewed by reflected light, and C represents the sensitive film or coating, the latter being applied either to the coating B, as in Fig. 1, or to the opposite side of a transparent plate from that which receives said coating B, as shown in Fig. 2. Barium sulfate is preferably used for the coating B because it can be advantageously incorporated in several ways with the medium which carries it and because it is a practically inert substance. Instead, however, of mixing barium sulfate with the gelatin or collodion body which carries it I may use chlorid of barium, for instance, which when dissolved and incorporated with the gelatin or collodion film will not detract from the natural transparency of the latter, the barium-sulfate pigment being subsequently precipitated in the coating by the action of the sulfate generally present in the developing solutions employed or being precipitated by a special treatment with a sulfate capable of accomplishing this result. My invention, however, is not to be understood as limited to the use of barium sulfate, as I can use any compound or compounds capable of producing a coating relatively transparent to transmitted light, but relatively opaque when viewed by reflected light or capable of being rendered so by subsequent treatment.

The element A serves simply as a support for the coatings B and C. Hence it is immaterial whether it is applied at the back of both coatings, as shown in Fig. 1, or between the coatings, as shown in Fig. 2, since the sensitive film is mainly intended to be exposed from the inner side, so that the rays of light must necessarily pass first through the coating B.

A fine grain or texture is produced in the finished positive picture when the rays pass through the coating B containing the pigment, but a more perceptible texture or grain can be obtained by preparing the coating B in the following manner:

Instead of flowing the coating upon the transparent support a suitably-etched plate is coated with the solution, and when the coating is dry a sheet of gelatin which has been previously dampened is applied to the coating and squeezed flat thereon, and when this gelatin sheet is pulled off it carries the coating with it. The greater portion of the coating will lodge in the indentations of the etched plate, and these portions of the coating will be opaque to reflected light, but the higher portions of the etched plate will receive but little coating, and these portions will be almost wholly transparent, the coating being thus partially transparent and partially opaque. The coating is then rendered waterproof in any suitable manner. The etched plate may be such as to produce any desired pattern, grain, or texture in the coating B. For instance, in Fig. 3 the indentations of the etched plate are represented by the heavily-shaded portions, while the surface or higher portions of the plate are represented by the lightly-shaded portions.

The coating B may be applied directly to the sensitized gelatin film or to the sensitive emulsion itself, or in some cases the grain or texture effect can be obtained by giving the sensitized film a slight preliminary exposure under an etched transparent negative.

I am aware that screens have been used through which to filter light in its passage to a sensitive film; but I am not aware that any such screens have been used to give texture or grain to a sensitive surface or transparency to transmitted light and opacity when viewed by reflected light for the purpose of giving the proper values to a positive picture produced upon said sensitive surface.

Having thus described my invention, I claim and desire to secure by Letters Patent—

1. A photographic body comprising different strata, one of said strata being light-transmitting, another stratum being of less transparency than the first, and said strata forming a support which is relatively transparent to transmitted light but relatively opaque to reflected light, and a sensitized coating applied to one of the faces of said support.

2. A photographic body consisting of a suitable support having a sensitive coating, in combination with material other than the support and capable of forming, for a positive picture, a background relatively transparent to transmitted light but which is, when viewed by reflected light, of a color suitable for the high lights of said positive picture.

3. A photographic body consisting of a suitable support having a sensitive coating, in combination with material other than the support and which is normally transparent, but is susceptible of developing a color which, when viewed by reflected light, is suitable for the high lights of a positive picture.

4. A photographic body consisting of a suitable support having a sensitive coating, in combination with a material constituting a pattern and capable of forming, for a positive picture, a background relatively transparent to transmitted light but which is, when viewed by reflected light, of a color suitable for the high lights of said positive picture.

5. A photographic body consisting of a transparent support susceptible of exposure from either side and having a sensitive coating, in combination with material other than the support and capable of forming, for a positive picture, a background relatively transparent to transmitted light but which is, when viewed by reflected light, of a color suitable for the high lights of said positive picture.

In testimony whereof I have signed my name to this specification in the presence of two subscribing witnesses.

GEORGE N. PIFER.

Witnesses:
JOHN F. ROCHE,
HARRISON W. BOWKER.